May 5, 1953  J. H. BOOTH ET AL  2,637,568
STEERING KNUCKLE
Filed April 11, 1951
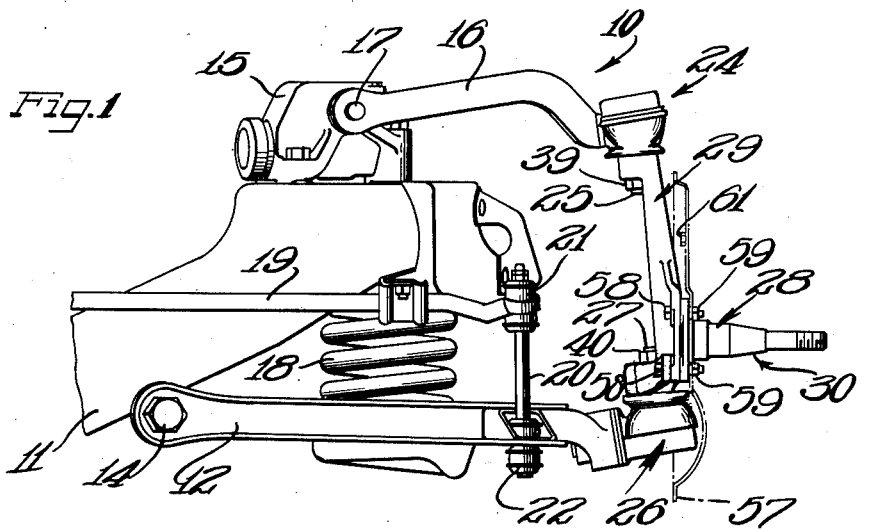
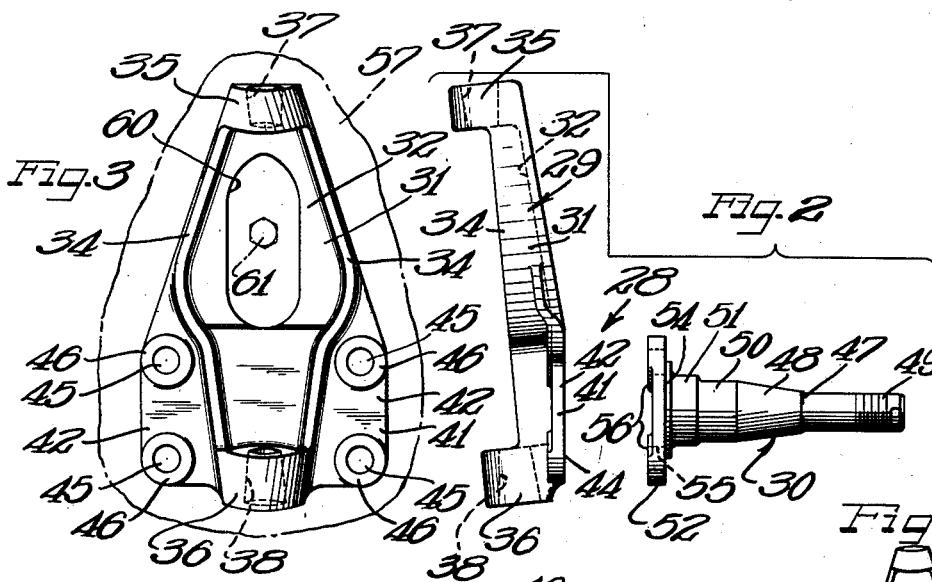
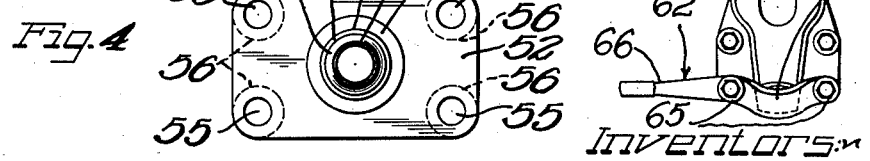
INVENTORS.
James H. Booth
Albert W. Gair Patented May 5, 1953

2,637,568

UNITED STATES PATENT OFFICE 2,637,568

STEERING KNUCKLE

James H. Booth, Corunna, and Albert W. Gair, Fraser, Mich., assignors to Thompson Products, Inc., Cleveland, Ohio, a corporation of Ohio Application April 11, 1951, Serial No. 220,458

2 Claims. (Cl. 280—96.2)

The present invention relates to an improved steering knuckle construction for use in an independent steerable wheel suspension in a vehicle. More particularly, the invention relates to an improved and simplified steering knuckle assembly in which the spindle support contains integral means at each end thereof for attaching to the control arms of an independent wheel suspension and in which a separable spindle is fixedly attached to the spindle support by means of mating attachment pads on the spindle support and the spindle.

In an automotive type independent steerable wheel suspension it is important to provide a strong durable steering knuckle assembly of simplified construction in which the cost of manufacture of the various components is low and the assembly time at a minimum.

Furthermore, it is important that all portions of the wheel suspension system be readily accessible for replacement or repair.

According to the present invention an independent steerable wheel suspension, including upper and lower control arms pivotally mounted on an automobile frame and ball joints provided at the outer ends of the control arms has a spindle support fixedly attached to the studs of the ball joints for pivoting of the spindle support relative to the control arms. In order to fixedly attach the ball joint studs to the spindle support, axially aligned tapered holes are formed in upper and lower end bosses formed on the spindle support for receiving the tapered portions of the studs in complementary relation. The spindle support has a body portion including a web and a pair of integral reinforcing flanges or ribs extending between the bosses. An integral attachment pad of substantially rectangular plan form is formed on the body portion near the lower end thereof and has a flat face roughly parallel to the kingpin axis of the tapered holes and on the opposite side of the spindle support from the bosses and ribs. A wheel support spindle having an elongated shank with a tapered portion and a reduced diameter threaded end portion is formed with an integral perpendicular attachment pad at the end opposite to the threaded end. The spindle attachment pad is of rectangular plan form and is abutted against the outward face of the spindle support attachment pad. Four aligned bolt holes or apertures are formed through the respective attachment pads and contain bolts, rivets or the like to fixedly attach the spindle to the spindle support. A brake backing plate is also attached to the steering knuckle by means of the four bolts. The lower two bolts may be utilized for attaching a steering or plane arm. A relatively large access aperture or opening is provided through the web of the spindle support to provide ready access to the face of the brake backing plate opposing the spindle support in order to permit removal or insertion of bolts or screws which might be used for attaching part of the brake mechanism such as the brake wheel cylinder.

Thus, in this invention a damaged spindle, for example, could be replaced by removing the wheel and brake assembly without requiring any disturbance in the arrangement of the control arms, the front springs, the shock absorber, etc. In addition, all attachment and adjustment bolts and screws are readily accessible.

It is, therefore, an object of the present invention to provide an improved steering knuckle assembly for use in an independent wheel suspension.

Another object of the invention is to provide a simplified two piece steering knuckle construction including a spindle support with two tapered stud-receiving holes and a spindle detachably secured thereto in a simplified manner.

A further object of the invention is to provide a simplified and improved spindle support for use in an independent steerable wheel suspension including means for attaching a separable wheel support spindle.

Still another object of the present invention is to provide a simplified spindle support for use in independent steerable wheel suspensions and having upper and lower end bosses with aligned tapered holes therein connected by a body portion with a web and integral reinforcing ribs with an access opening provided through the web.

A still further object of the invention is to provide an improved wheel support spindle particularly adapted for use with a separable spindle support.

Other objects, features and advantages of the present invention will be apparent from the following detailed description of one embodiment, by way of preferred example only, taken in conjunction with the accompanying drawings.

On the drawings:

Figure 1 is a fragmentary front elevational view of an independent steerable wheel suspension including a steering knuckle assembly according to the present invention;

Figure 2 is an enlarged exploded front elevational view of the steering knuckle assembly less the attachment bolts;

Figure 3 is an inside elevational view of the spindle support shown in Figure 2 showing a broken away portion of the brake backing plate with a bolt in position for removal through the spindle support access opening;

Figure 4 is an outside end elevational view of the wheel support spindle shown in Figure 2; and Figure 5 is a reduced size inside elevational view of the wheel support spindle with a plane arm in position for attachment thereto.

As shown on the drawings:

In Figure 1 is shown an independent steerable wheel suspension 10 of an automobile or the like including a cross frame member 11 and a lower control arm or load carrying arm 12 pivotally attached at its inner end portion to the frame member 11 by means of an attachment bolt 14. A shock absorber 15 is fixedly mounted on the upper side of the end portion of the cross frame member 11 and has an upper control arm 16 pivotally and operatively attached at its inner end portion to the shock absorber 15 at 17. A coil support spring 18 is operatively disposed between the lower control arm 12 outwardly of the bolt 14 and the cross frame member 11 to resiliently transmit the weight of the automobile (not shown) from the frame member to the load carrying arm 12 for transmitting the load to a wheel (not shown). A torsion rod 19 is connected at one end portion to the lower control arm 12 outwardly of the spring 18 by means of a link 20 and associated attachment means 21 and 22.

A ball joint 24, of the controlled friction shimmy dampening type, has its casing fixedly attached to the outer end portion of the upper control arm 16 and has a stud 25 tiltably and rotatably retained in the ball joint with an attachment portion extending downwardly therefrom. An anti-friction load carrying ball joint 26 has its casing fixedly attached at the outer end portion of the lower control arm 12 and has a stud 27 tiltably and rotatably retained in the ball joint with an attachment portion extending upwardly therefrom. The studs 25 and 27 are in axial alignment.

According to the present invention, a steering knuckle assembly 28 includes a spindle support 29 and a separable wheel support spindle 30, both preferably formed of forged steel or the like. The spindle support 29 has a body portion 31 including a web 32 and a pair of integral longitudinal reinforcement flanges or ribs 34. Integral attachment bosses 35 and 36 are formed at the upper and lower ends of the body portion 31, respectively, and extend substantially perpendicularly with respect to the web 32 in the same direction as the reinforcing ribs 34. Longitudinally inwardly tapered coaxial stud attachment holes 37 and 38 are formed longitudinally through the upper and lower bosses 35 and 36, respectively. The tapered attachment holes 37 and 38 are adapted to receive mating tapered portions (not shown) on the ball joint studs 25 and 27 for locking the studs in the tapered holes by means of stud attachment nuts 39 and 40.

An integral attachment pad 41, of roughly rectangular plan form, is formed by means of integral ears 42, 42 formed transversely outwardly on each side of the body portion 31 near the lower end of the spindle support. An outwardly exposed face 44 is afforded by the attachment pad 41 which is roughly parallel to the king-pin pivoting axis of the spindle support provided by the axis of the tapered holes. It will be understood that the slight angle between the face 44 and the king-pin axis is the king-pin angle and may be varied according to the particular vehicle requirements. Two bolt holes or apertures 45 are provided through each of the ears 42 and have integral upstanding annular bosses 46 provided about each of the apertures 45 on the side of the pad opposite the face 44.

The wheel support spindle 30 comprises an elongated shaft 47 with a tapered portion 48 and a reduced diameter externally threaded end portion 49 for receiving a wheel retaining nut (not shown). Inwardly of the tapered portion 48 is provided a cylindrical portion 50 succeeded inwardly by an increased diameter cylindrical portion 51. An integral attachment pad 52, of rectangular plan form, is formed at the inner end of the spindle shaft 47 and has an outwardly facing circular embossment 54 between the pad and the cylindrical portion 51. Four bolt holes or apertures 55 are provided through the attachment pad 52 in the same pattern as the bolt apertures 45 in the spindle support attachment pad 41. Integral upstanding annular bosses 56 are provided on the inward face of the attachment pad 52 about the bolt apertures 55 to provide bearing pads thereabout.

In order to provide a brake support structure for a wheel (not shown) mounted on the wheel support spindle 30, a brake backing plate 57 (shown in phantom outline) is adapted for mounting against the outward face of the spindle attachment pad 52. As shown in Figure 1, the spindle support 29, the spindle 30 and the brake backing plate 57 are fixedly mounted by pin means herein shown as mounting bolts 58 inserted through the mating bolt apertures and provided with nuts 59.

A steering or plane arm 62, formed of forged steel or the like, is provided with an offset web portion 64 spanning the lower boss 36 and has a pair of attachment bosses 65 receiving the lower two mounting bolts 58 therethrough for fixedly securing the arm to the steering knuckle in a non-interfering position. An integral extension 66 is adapted for connection to the vehicle steering linkage (not shown).

For providing free access to the face of the brake backing plate 57 opposing the spindle support web 32 a longitudinally elongated access aperture or opening 60 is formed through the web. Thus, an attachment or adjustment bolt or screw lying between the brake backing plate and the web 32, such as a brake mechanism bolt 61, may be easily reached for adjustment or removal without necessitating removal of the brake backing plate 57 from the steering knuckle assembly and without the use of a special wrench or the like.

From the above description it will be readily understood that the present invention provides an improved and simplified steering knuckle assembly for use in an independent steerable wheel suspension for a vehicle. The steering knuckle assembly is of two-piece construction with an improved spindle support including integral upper and lower ball joint connection means and an access aperture through the web thereof to provide access to the inner face of the brake backing plate. The second portion of the steering knuckle assembly is a separable wheel support spindle having an attachment pad for connection to a mating attachment pad formed on the spindle support.

It will be understood that modifications and variations may be effected without departing from the scope of the novel concepts of the present invention.

We claim as our invention:

1. A steering knuckle assembly for supporting a wheel and braking mechanism including a brake backing plate, said steering knuckle assembly comprising a spindle support having upper and lower integral end bosses with axially aligned tapered holes in the bosses for fixedly receiving studs of ball joint pivots, said spindle support having a generally triangularly shaped central web with a relatively large access opening therethrough and integral reinforcement ribs extending between said bosses and around said opening, said spindle support having an integral attachment pad with a face roughly parallel to the axis of said tapered holes, a wheel spindle having an integral attachment pad with an end face substantially perpendicular to the spindle axis, said spindle support and spindle attachment pads and said brake backing plate having a plurality of aligned apertures, and attachment means in said apertures for fixedly securing said pads together and said brake backing plate to said pads, said spindle support access opening providing ready access to the face of said backing plate opposing said spindle support.

2. A steering knuckle assembly comprising a spindle support having upper and lower integral end bosses with axially aligned tapered holes in the bosses for fixedly receiving the studs of supporting ball joints, said spindle support having a pierced, generally triangular shape with the upper integral end boss forming one corner of said triangle and with said lower integral end boss lying approximately midway between the remaining corners of said triangle, said spindle support having an integral rectangular attachment pad thereon, and further having integral longitudinal reinforcement ribs extending downwardly from said upper integral end boss along the edges of said triangle for approximately half the length of said spindle and then converging to join said lower integral end boss, and a wheel spindle having an attachment pad for cooperation with said spindle support attachment pad whereby said spindle support and spindle may be fixedly secured together.

JAMES H. BOOTH.
ALBERT W. GAIR.

References Cited in the file of this patent

UNITED STATES PATENTS

| Number | Name | Date |
|---|---|---|
| 2,226,406 | Krotz | Dec. 24, 1940 |
| 2,311,125 | Phelps | Feb. 16, 1943 |
| 2,521,335 | Booth | Sept. 5, 1950 |
| 2,556,767 | McCann | June 12, 1951 |

FOREIGN PATENTS

| Number | Country | Date |
|---|---|---|
| 174,755 | Great Britain | Feb. 3, 1922 |
| 579,432 | Great Britain | Aug. 2, 1946 |
| 719,047 | Germany | Mar. 27, 1942 |